Patented May 24, 1949

2,470,777

UNITED STATES PATENT OFFICE 2,470,777

PROCESS OF PREPARING 10,11-DIHYDRO-7-R-PHENANTHRO-[2,1-d] ISOXAZOLES, AND PRODUCTS OF SUCH PROCESS

William S. Johnson, Madison, Wis., Jack W. Petersen, Oakland, Calif., and Carl David Gutsche, St. Louis, Mo., assignors to Wisconsin Alumni Research Foundation, Madison, Wis., a corporation of Wisconsin No Drawing. Original application October 1, 1946, Serial No. 700,380. Divided and this application November 13, 1947, Serial No. 785,822

6 Claims. (Cl. 260—307)

The invention of this application is directed to the production of certain 10,11-dihydro-7-R-phenanthro-[2,1-d] isoxazoles, and to those compounds themselves; which are useful in the synthesis of steroids of the type in which both rings A and B are aromatic—and especially in the synthesis of equilenin and desoxyequilenin—and are produced by the second step of that synthesis.

The complete synthesis of these steroids involves five steps; which, however, except as will be indicated, we believe to be individually new. The claims of the present application are directed specifically to the second step, and to the products obtained thereby; and the first, third, fourth, and fifth steps form the subject-matter of four separate applications, respectively. The present application is a division, as are three of said four companion applications, of the fourth of those companion applications; which is directed specifically to the fifth step of the synthesis, and which is Serial No. 700,380, filed October 1, 1946. The filing of the divisional applications is in response to a requirement for division by the Patent Office, made in such parent application Serial No. 700,380, in which all five steps and their products were originally claimed.

Because the claims of the present application are limited to the second step of the complete synthesis, only that step will be described in full detail in this application; and the other four steps will be set forth only in the general description.

The five steps of the complete synthesis of the steroids are as follows:

a. 1-keto-7-R-1,2,3,4-tetrahydrophenanthrene, in which R indicates a substituent in the class consisting of hydrogen and lower-alkoxy groups and lower-aralkoxy groups, desirably either hydrogen or the methoxy group, is condensed with a lower-alkyl formate, conveniently ethyl formate, in the presence of sodium methoxide, and desirably in an inert solvent, such as benzene for example; to produce 1-keto-2-hydroxymethylene-7-R-1,2,3,4-tetrahydrophenanthrene, as follows:

(1) 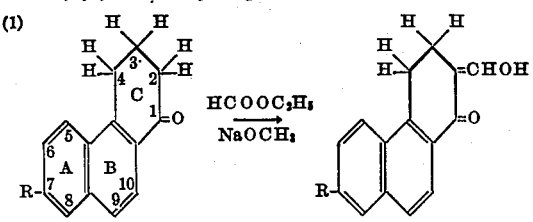

This product is new when R is an alkoxy or aralkoxy group, but not when R is hydrogen.

b. 1-keto-2-hydroxymethylene-7-R-1,2,3,4-tetrahydrophenanthrene is treated with hydroxylamine, desirably as the hydrochloride dissolved in acetic acid; to produce 10,11-dihydro-7-R-phenanthro-[2,1-d]isoxazole, as follows:

(2) 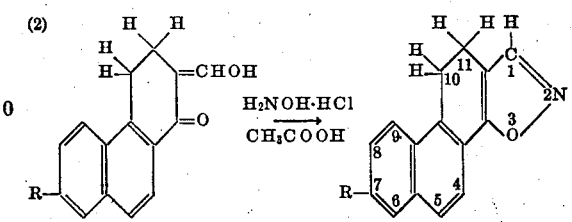

This product is new.

c. The 10,11-dihydro-7-R-phenanthro-[2,1-d] isoxazole, desirably in an inert solvent, benzene for example, is treated with an alkali-metal alkoxide conveniently sodium methoxide, followed by a methyl heavy-halide, preferably methyl iodide but permissibly methyl bromide; to produce (first) 2-cyano-1-keto-7-R-2-sodio-1,2,3,4-tetrahydrophenanthrene, which is commonly not isolated, and (second) 2-cyano-1-keto-7-R-2-methyl-1,2,3,4-tetrahydrophenanthrene, as follows:

(3) 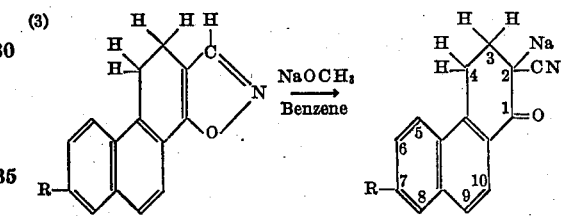

(4) 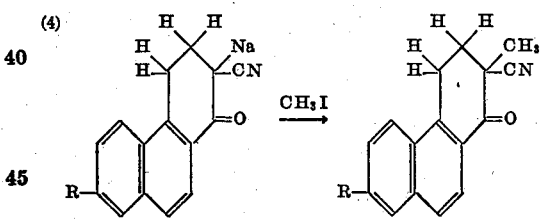

The products obtained by Reactions 3 and 4 are new.

By treating the product of Reaction 3 with a mineral acid, we can get a modification in which a hydrogen atom takes the place of the sodium atom; and, if desired, that modified product, after being treated with sodium methoxide, may be used as the starting point for Reaction 4.

d. The 2-cyano-1-keto-7-R-2-methyl-1,2,3,4-tetrahydrophenanthrene is condensed with a di-lower-alkyl succinate, preferably dimethyl succinate, in the presence of an alkali-metal tertiary-lower-alkoxide, conveniently potassium tertiary-butoxide; preferably followed by treatment with a mineral acid, for instance hydrochloric acid; to produce a 15 - carboalkoxy-14,15-dehydroequilenin ether or 15-carboalkoxy-14,15-dehydrodesoxyequilenin, according to whether R is a radical or hydrogen; and the product so obtained is hydrolyzed, desirably with barium hydroxide followed by hydrochloric acid, to give the free acid, a 15-carboxy-dehydroequilenin ether or 15-carboxy - dehydro - desoxyequilenin. The products so obtained are new.

e. This free acid, 15-carboxy-dehydroequilenin ether or 15-carboxy-dehydrodesoxyequilenin, is decarboxylated by heating under reduced pressure; to produce a mixture of two isomeric dehydroequilenin ethers or a mixture of two isomeric dehydrodesoxyequilenins according to whether R is a radical or hydrogen. The isomers of each pair probably differ by having a double bond in the 14,15-position on the one hand and in the 15,16-position on the other. This product, with or without separating its component isomers, is hydrogenated, desirably over a palladium-charcoal catalyst, to produce two compounds, one of which is a racemic equilenin ether or a racemic desoxyequilenin and the other of which is a racemic isoequilenin ether or a racemic desoxyisoequilenin, in each case according to whether R is a radical or hydrogen. The two compounds so produced are stereoisomers in each case. These two compounds are separated, as by fractional crystallization. In the case where R is hydrogen, this separation gives directly d,l-desoxyequilenin and d,l-desoxyisoequilenin. In the case where R is methoxy, the separated compounds are demethylated, by known methods, to obtain respectively d,l-equilenin and d,l-isoequilenin. The d,l-equilenin is resolved, by known methods, to obtain d-equilenin, which is found to be identical with natural equilenin.

The following are examples of the process of the present application, and the products obtained thereby—obtained by the first two of the five steps of the complete steroid synthesis. The melting points given are all corrected for stem exposure.

*Example 1.—The preparation of 10,11-dihydro-7-methoxyphenanthro-[2,1-d] isoxazole, useful for preparing equilenin*

To a suspension of powdered sodium methoxide (prepared by dissolving 3.39 g. of sodium in methanol, removing excess methanol by evaporation under reduced pressure, and heating at approximately 200° C. for one hour under high vacuum) in 70 cc. of dry benzene, is added 10.90 g. of ethyl formate; after which is added a solution of 16.54 g. of 1-keto-7-methoxy-1,2,3,4-tetrahydrophenanthrene in 110 cc. of benzene. The system containing the mixture is evacuated; and then filled with nitrogen, and allowed to stand at room temperature for about 5 hours, with occasional swirling. A copious yellow precipitate is formed. This precipitate is dissolved by shaking with ether and ice water, and then allowing the whole to separate into two layers. The water layer, which contains the 1-keto-7-methoxy - 2 - hydroxymethylene - 1,2,3,4-tetrahydrophenanthrene in the form of the sodio derivative, is separated from the ether layer and preserved; and for complete recovery the ether layer is desirably washed thoroughly with water and with dilute potassium hydroxide solution and the washings added to the separated aqueous layer. The combined aqueous solution is then acidified, to cause separation of the 1-keto-2-hydroxymethylene - 7 - methoxy - 1,2,3,4-tetrahydroxyphenanthrene, as yellow crystals. As first obtained, these give a yield of about 17.73 g. (or 95%), melting at about 130–131.5° C.; which is of satisfactory purity for the next step. The crystals may be purified if desired, as by recrystallization several times with alcohol; but the melting point is not materially changed, although somewhat sharpened, for the recrystallized crystals have a melting point of 130–130.6° C.

Analysis shows the following: Calculated for $C_{16}H_{14}O_3$: C, 75.57%; H, 5.55%. Found, C, 75.37%; H, 5.68%.

The yellow crystalline 1-keto-2-hydroxymethylene-7-methoxy-1,2,3,4-tetrahydrophenanthrene thus obtained is used as the starting point for the next step. The 17.73 g. of that hydroxymethylene ketone is dissolved in about 400 cc. of glacial acetic acid, and the solution is stirred with 7.25 g. of dry powdered hydroxylamine hydrochloride at about 68–70° C. (the temperature of solution) for about 7 hours. The solution becomes pink. The hot pink solution is diluted with about an equal volume of hot water to the point of incipient cloudiness, and then allowed to cool; and on such cooling a deposit is obtained of usually colorless (although sometimes colored) crystals of 10,11-dihydro-7-methoxyphenanthro-[2,1-d] isoxazole. The yield is about 15.81 g. (or about 90%), after drying at 100–110° C. The melting point is about 137–138° C., with softening preceding melting. Purification may be obtained by evaporative distillation at 150° C. at 0.5 to 1 mm. pressure, followed by recrystallization from a mixture of methanol and ethyl acetate; which gives colorless crystals melting at 139.5–140° C.

Analysis shows the following: Calculated for $C_{16}H_{13}O_2N$: C, 76.47%; H, 5.21%. Found: C, 76.71%; H, 5.07%.

The crude isoxazole may contain a small amount of a benzene-insoluble material, possibly a phenolic product resulting from demethylation; but is nevertheless sufficiently pure for the next step.

The above procedure may be conveniently altered in the following way: A mixture of 16.87 g. of the crude 1-keto-2-hydroxymethylene-7-methoxy-1,2,3,4-tetrahydrophenanthrene, 400 cc. of glacial acetic acid, and 6.91 g. of hydroxylamine hydrochloride, is quickly heated to boiling in an oil bath maintained at about 170° C. The refluxing is then continued for about 7 minutes, whereupon the solution (which is now red) is diluted with hot water until definitely turbid. The whole is then allowed to cool several hours in an ice box, during which time crystallization of the 10,11 - dihydro - 7 - methoxyphenanthro - [2,1-d] isoxazole occurs. The isoxazole as thus obtained is in the form of tan-colored plates melting at about 137–138° C., and the yield is about 15.80 g. (about 95%). The isoxazole thus obtained may be used as the starting point for the remaining three steps of the complete synthesis; which are outlined in the general description given above and are set forth in detail in the companion applications above referred to, and which lead to the production of equilenin.

*Example 2.—The preparation of 10,11-dihydrophenanthro-[2,1-d] isoxazole, useful for preparing desoxyequilenin*

To a suspension of powdered sodium methoxide (prepared by dissolving 1.28 g. of sodium in methanol, removing the excess methanol by evaporation under reduced pressure, and heating at approximately 200° C. for 1 hour under high vacuum) in 100 cc. of dry benzene, is added 4.12 g. of ethyl formate; after which is added a solution of 5.40 g. of 1-keto-1,2,3,4-tetrahydrophenanthrene in 50 cc. of benzene. The system containing the mixture is evacuated, and then filled with nitrogen and allowed to stand at room temperature for about four hours, with occasional swirling. During this time the mixture very slowly assumes a slight pink tinge and gradually becomes very viscous. Cold water is then added, followed by a small amount of ether to minimize formation of emulsions, and the whole is shaken well and then allowed to separate into two layers. The water layer, which contains 1-keto-2-hydroxymethylene-1,2,3,4-tetrahydrophenanthrene in the form of its sodio derivative, is separated from the ether layer and preserved; and for complete recovery the ether layer is desirably washed thoroughly with water and with dilute potassium hydroxide solution and the washings added to the separated aqueous layer. The combined aqueous solution is then acidified, to cause the separation of the 1-keto-2-hydroxymethylene-1,2,3,4-tetrahydrophenanthrene, as a light-yellow solid. The yield of this product is about 5.82 g. (or 94%), and the melting point is about 82–83° C. This corresponds fairly closely with the melting point reported by Meyer and Reichstein for the same compound produced by a different procedure. See Pharmaceutical Acta Helvetiae, vol. 19, page 128 et seq., published in 1944.

The 1-keto-2-hydroxymethylene-1,2,3,4-tetrahydrophenanthrene thus obtained is used as the starting point for the next step: 21.5 g. of that hydroxymethylene ketone is dissolved in about 410 cc. of glacial acetic acid, and the solution is stirred with 9.75 g. of dry powdered hydroxylamine hydrochloride at about 85° C. for about 6 hours. Sufficient crushed ice is then added to bring the volume of solution to about 2 liters. When the ice has melted, there is present a light pink solid, which is filtered off and dried in an oven at about 60° C. This solid is 10,11-dihydrophenanthro-[2,1-d] isoxazole; it amounts to about 20 g. (a 94% yield), and has a melting point of about 104–107° C. This material is of satisfactory purity for the next step in the synthesis. Purification may be obtained if desired, by recrystallization from dilute alcohol; which gives colorless crystals melting at 109.8–110.5° C.

Analysis shows the following: Calculated for $C_{15}H_{11}ON$: C, 81.42%; H, 5.01%; N, 6.33%. Found: C, 81.71%; H, 4.90%; N, 6.48%.

The isoxazole thus obtained may be used as the starting point for the remaining three steps of the complete synthesis; which are outlined in the general description given above and are set forth in detail in the companion applications above referred to, and which lead to the production of desoxyequilenin.

We claim as our invention:

1. The process of producing a 10,11-dihydro-7-R-phenanthro-[2,1-d] isoxazole, in which R is a member of the class consisting of hydrogen and lower alkoxy groups and lower aralkoxy groups, which consists in treating a 1-keto-2-hydroxymethylene-7-R-1,2,3,4 - tetrahydrophenanthrene with hydroxylamine.

2. The process as set forth in claim 1, in which the hydroxylamine is in the form of the hydrochloride.

3. The process as set forth in claim 1, in which the treatment is done in the presence of acetic acid.

4. A 10,11-dihydro - 7 - R-phenanthro-[2,1-d] isoxazole, in which R is a member of the class consisting of hydrogen and lower alkoxy and lower aralkoxy groups.

5. 10,11-dihydro-7-methoxyphenanthro-[2,1-d] isoxazole.

6. 10,11-dihydrophenanthro-[2,1-d] isoxazole.

WILLIAM S. JOHNSON.
JACK W. PETERSEN.
CARL DAVID GUTSCHE.

No references cited.